United States Patent [19]
Goldenthal et al.

[11] Patent Number: 6,112,176
[45] Date of Patent: Aug. 29, 2000

[54] SPEECH DATA COLLECTION OVER THE WORLD WIDE WEB

[75] Inventors: William D. Goldenthal; Christopher M. Weikart, both of Cambridge, Mass.

[73] Assignee: Compaq Computer Corporation, Houston, Tex.

[21] Appl. No.: 08/857,449

[22] Filed: May 16, 1997

[51] Int. Cl.[7] .............................. G10L 15/02; G10L 15/18
[52] U.S. Cl. .......................... 704/257; 704/231; 704/251; 704/260; 704/270; 704/275; 707/501; 707/513
[58] Field of Search ................................... 704/201, 270, 704/275, 231, 251, 257, 260; 707/501, 513

[56] References Cited

U.S. PATENT DOCUMENTS

| | | | |
|---|---|---|---|
| 5,715,370 | 2/1998 | Luther et al. | 704/275 |
| 5,737,395 | 4/1998 | Irribarren | 379/88 |
| 5,787,254 | 7/1998 | Maddalozzo, Jr. et al. | 395/200.58 |
| 5,819,220 | 10/1998 | Sarukkai et al. | 704/243 |
| 5,915,001 | 6/1999 | Uppaluru | 379/88.22 |
| 5,960,399 | 9/1999 | Barclay et al. | 704/270 |

OTHER PUBLICATIONS

"Corpus Development Activities at the Center for Spoken Language Understanding," Cole et al., Oregon Graduate Institute of Science and Technology, Proc. Of the ARPA Workshop on Human Language Technology, Apr. 7–11, 1994.

"Accessing Information by Voice on the World Wide Web," Hemphill et al., Texas Instruments and Stanford Univ., Dallas, Texas.

"Towards Automatic Collection of the U.S. Census," Cole et al., Oregon Graduate Institute of Science & Technology, Proc. ICASSP–94, IEEE 1994.

"Telephone Data Collection Using The World Wide Web," Hurley et al., MIT, Cambridge, Mass.

*Primary Examiner*—David R. Hudspeth
*Assistant Examiner*—Abul K. Azad
*Attorney, Agent, or Firm*—Hamilton, Brook, Smith & Reynolds, P.C.

[57] ABSTRACT

In a computerized method for collecting speech data, Web pages of client computers connected to the Internet are enabled to acquire speech signal and information characterizing the speech. The addresses of the enabled Web pages are stored in a list in a memory of a Web server computer. Based on predetermined criteria and the list, some of the enabled client computers are selected to acquire the speech signal and information. The acquired speech signal and information are transmitted to the server computer to generate, train, and evaluate acoustic-phonetic models.

12 Claims, 2 Drawing Sheets

_SPEECH DATA COLLECTION OVER THE WORLD WIDE WEB_

FIELD OF THE INVENTION

The present invention relates generally to automated speech processing, and more particularly to collecting data for training or evaluating models.

BACKGROUND OF THE INVENTION

Computerized speech processing systems can be used for automated speech recognition (understanding what is being said), speaker identification (who is speaking), and speaker verification (authenticating that the speaker really is who he or she claims to be). An important element in developing computerized speech processing systems is to collect and annotate speech data for training or evaluating acoustic-phonetic models used during continuous speech processing. In continuous speech processing, the words and phrases flow into one and another naturally without artificial pauses.

In order to build robust models, speech from hundreds, perhaps thousands of individual speakers must be collected. This is an arduous and time consuming task, particularly if the system includes models for processing speech spoken in different languages.

Other than the variability in the linguistic groupings of the speech data, another important factor to consider while collecting speech training data is the variability in the acoustic characteristics of the environments where the speech is being produced and collected. In the prior art, a large effort has gone into collecting speech data using public (analog) telephone networks. There, variable acoustic characteristics can be attributed to background noise, telephone handsets, transmission lines, and switching equipment, and the like.

More recently, speech applications have moved to the "desk-top." Modern high speed PCs including lap-top computers can be configured with microphones, loudspeakers, and sound cards to acquire and reproduce speech signals. The computers can be interconnected by a (digital) network such as the Internet. Standard protocols such as the World Wide Web (the "Web") can be used to transmit and receive digitized speech signals between users all over the world.

Clearly, the models generated from speech data collected via telephone networks are of minimal use in Web based speech processing systems. For example, the acoustic characteristics of computer microphones connected to digital sound cards bear little resemblance to analog telephone handsets. Also, background noise and communication channels are quite different for telephone and Web-based networks.

Most prior art speech collection techniques for desk-top applications have required the speakers offering their speech to be present at the collection site. This means a trained individual must also be present to supervise the collection process. The acoustic environment at the training site is unlikely to representative of the environment in which the application will actually be used due to a mismatch in the training data. Also, the collection of data for specific sets of speakers, such as native speakers of a foreign language, may impose additional logistic constraints.

Therefore, it is desired to provide means for collecting speech data using an all digital network such as the Internet. Furthermore, it is desired, that standard network interfaces such as the World Wide Web can be used to interact with speakers while collecting speech training data. Furthermore, it is desired that the speech collection mechanism is widely distributed so that speech data for a large number of speakers can readily be collected.

SUMMARY OF THE INVENTION

In a computerized method for collecting speech data, some client computers connected to the Internet are enabled to acquire speech signals and information characterizing the speech via Web pages. The addresses of the enabled client computers pages are stored in a list in a memory of a Web server computer. Based on predetermined criteria, such as page domains, some of the enabled client computers are selected to acquire the speech signal and information. The acquired speech signal and information are transmitted to the server computer to generate, train, or evaluate language and semantic models.

DETAILED DESCRIPTION OF PREFERRED EMBODIMENTS

Figure 1:
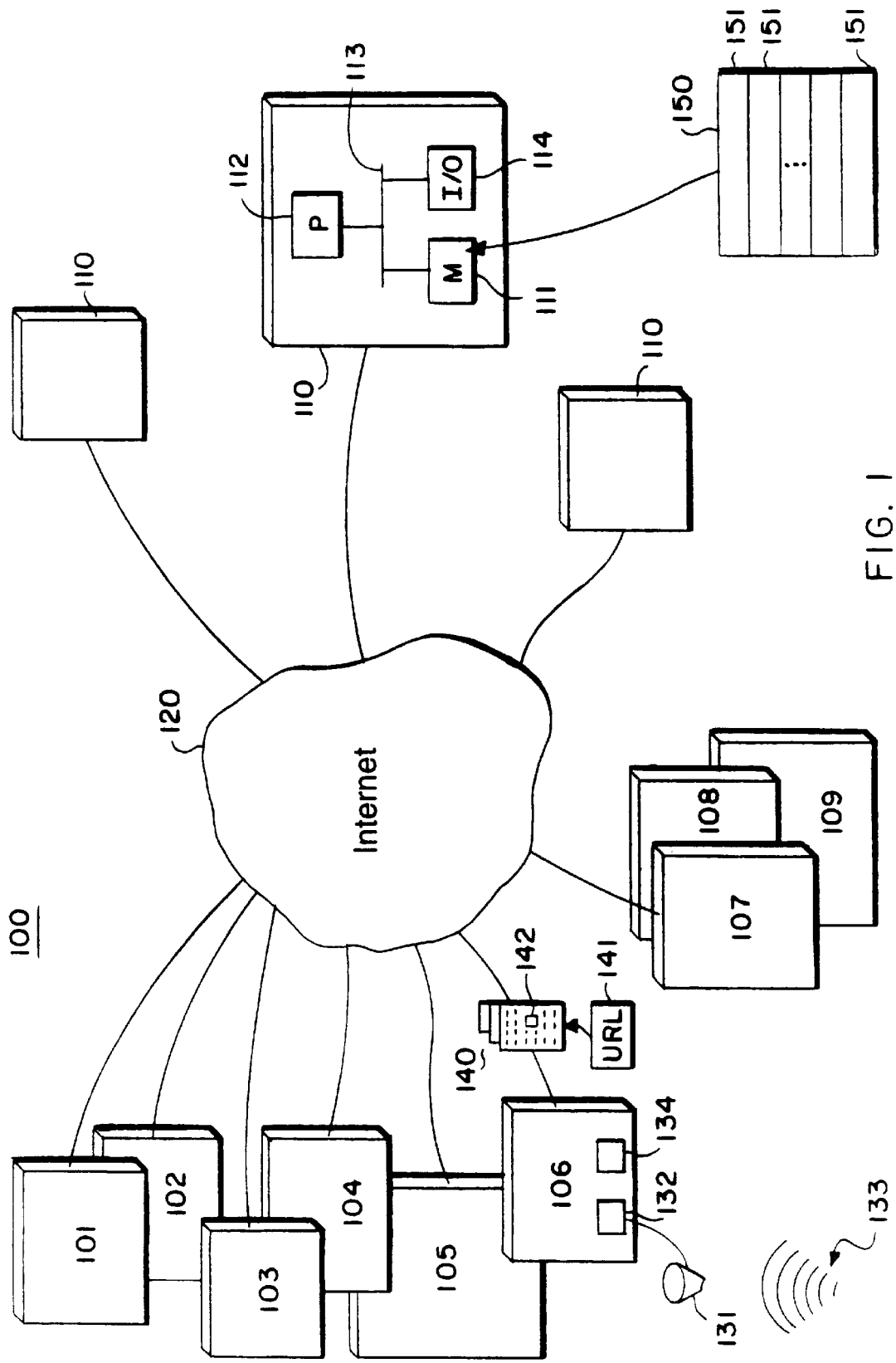
FIG. 1 is a block diagram of a Web based speech collection system according to the invention.

FIG. 1 shows a Web based speech collection system 100 according to the invention. The system 100 includes a plurality of client computers 101–109 and a plurality of server computers 110 connected to each other by a communications network 120.

The client computers 101–109 can be portable computers, e.g., lap-tops, PCs, workstations, or larger computer systems. The server computers 110 are usually configured as workstations, or larger computers. All of the computers 101–110, as shown for the server 110, are standardly configured with a memory sub-system (M) 111 connected to one or more processors (P) 112 via a bus 113. The computers can include input/output devices (I/O) 114 such as a mouse, keyboard, display terminal, printer, and network interface.

The memory sub-system 111 can include dynamic random access memories and storage such as floppies and hard disk drives for persistently storing programs and data. Application programs can execute under the control of system software such as Microsoft Windows 95. Programs and data can also be loaded into the computers via the network 120.

The client computers 101–109 can include a microphone 131 connected to a soundboard 132. The soundboard 132 can convert analog acoustic signals 133 to digital signals. The client computers can also include application programs for generating and downloading World-Wide-Web (WWW) pages 140.

The servers 110 include Web server software for delivering Web pages, such as page 140, to requesting client computers. In the preferred embodiment, the network 120 is the Internet which uses Internet TCP/IP communications protocols at the logical levels. In actual fact, the Internet interconnects millions of users of computers all over the world in many different countries speaking many different languages.

Resources of the Internet, such as the computers and Web pages (which are nothing more than standardly encoded data files) are identified by their unique addresses known as Universal Resource Locators (URL) 141, for example, "http://www.digital.com."

On the Internet, resources are grouped by function and geography into domains. For example, the domains "edu"

and "com" indicate educational and commercial Web sites located in the United States. The domains "fr," "jp," and "dk" respectively indicate resources located in France, Japan, and Denmark, and so forth. As an advantage, the present speech collection system can acquire speech data from selected domains.

During operation of the system 100, a user of any one of the client computers can activate a browser application program 134. The browser 134 can be stored on the disk of the client. For example, the browser can be the Netscape Navigator, or the Microsoft Internet Explorer. The browser 134 is used for locating and requesting Web pages, such as page 140, by specifying their URLs. Users can create Web pages using the HyperText Markup Language (HTML). The page 140 can be stored on a server for general access by any of the users of the network 120.

The server computers 110 execute web server software to deliver Web pages to client computers using the HyperText Transport Protocol (HTTP). For example, using the browser 134, the users of the client 106 can access the page 140 by specifying the URL 141 of the page 140 in a request messages such as "www.digital.com/user/my-home-page.html."

In response, the server 110 delivers the page 140 to the client. Once the page 140 arrives at the client 110, it can be stored on the local disk, and/or viewed on a display terminal using the browser 134.

Figure 2:
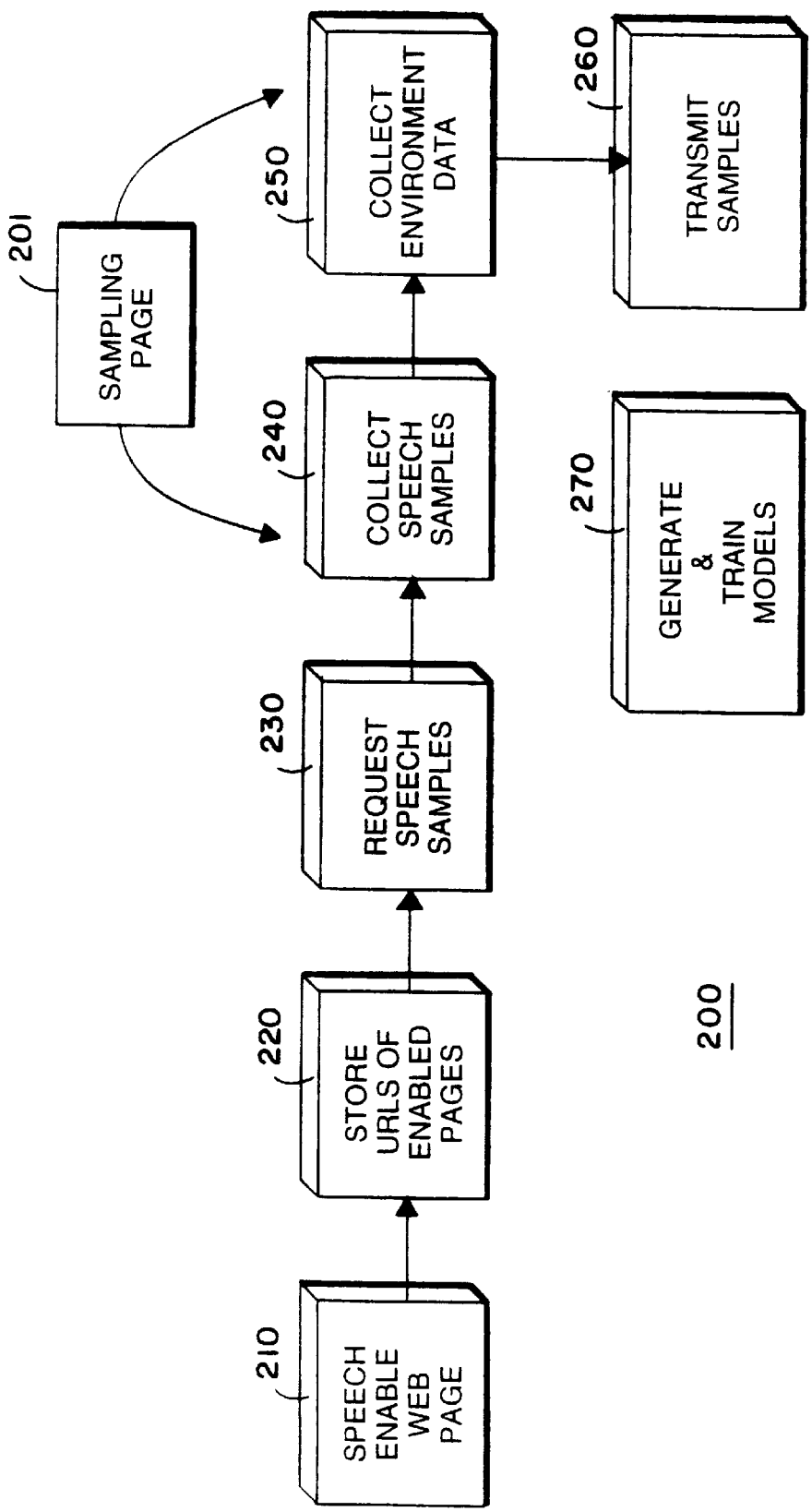
FIG. 2 is a block diagram of a process for collecting speech data.

FIG. 2 shows the method steps 200 for using selected Web pages to collect speech data. According to the preferred embodiment of the invention, the web page 140 includes an embedded HTML tag 142. The tag 142 specifies parameters for a "browser extension." A browser extension is a program which extends the capabilities of the browser application program. A specified extension can dynamically be retrieved by the client computer via the network 120 and stored in the memory of the client. The extension is executed from within the application environment of the browser 134. However, the extension cannot run as stand-alone application software.

In the preferred embodiment of the invention, the extension is a "plug-in," or an "applet." A plug-in extension is a hardware/software platform-specific program written in native executable code. A plug-in has access to the same machine resources as the browser. A plug-in is loaded and used in the client on demand.

Alternatively, if the extension is an applet, the extension is a platform-independent program written in JAVA code, and interpreted by a JAVA virtual machine (JVM). Security features limit the capabilities of the applet browser extension. The code of the applet is temporarily loaded along with the page 140. The code of the JAVA applet is discarded with the page.

More specifically, the Web page 140 includes a plug-in which can acquire speech signals, and send the speech signals to another computer connected to the Internet 120, for example, one of the servers 110, using Internet standard communication protocols. Such a system is described in U.S. Patent Application "Browser-based Electronic Messaging," Ser. No. 08/710,696, filed by Weikart et al. on Sep. 19, 1996. There, the specific application of the plug-in permits a user of a client computer to record and forward voice-mail messages using Web pages and a browser.

Here a modified version of the plug-in of a "speech" enabled Web page 140 is used to collect speech data for generating and training speech processing models. Using the Web as a medium for collecting speech data resolves many of the difficulties described above. Users can contribute speech data in their own environments. Enabling a client computer for speech collection using a Web page is performed in step 210 of FIG. 2.

As an advantage, the acoustic signature of the environment at the collection point is more likely to accurately reflect the conditions under which speech processing applications will be used. In addition, the Web based system enables targeted speech collection, for example, from client computers at specific Web domains which correspond to individual countries or linguistic groupings.

For each client computer that has a Web page that is speech enabled with a plug-in, the server supplying the plug-in can store Internet Protocol (IP) domain information, i.e., the IP addresses or host name 151 of the requesting client computers in a list 150 of its memory sub-system 111, step 220. Subsequently, the server computer can use the list 150 to request users of selected speech enabled client computers to supply speech samples, step 230. For example, if it is desired to train, or evaluate acoustic-phonetic models for French speakers, only client computers in the domain "fr" are selected.

In step 240, the speech samples are collected. For example, the server can supply, using another Web page (a sampling Web page 201), phrases for the user to speak. The phrases can be displayed in the language appropriate for the domain of the selected user.

In step 250, other information characterizing the speaker and the acoustic environment can be collected. This other information can be supplied by the user using a sequence of queries of the sampling Web page 201. Information characterizing the speaker can include, gender, age, weight, and height.

The environment information can include characteristics of the microphone and sound card being used by the selected client computer. Alternatively, some of the characteristics which influence the acoustic environment can be directly obtained from the client computer by reading registers and files maintained by the client computer for storing hardware related information.

In step 260, the sampled speech and environment information is transmitted to the server computer. In step 270, samples are used to train or evaluate acoustic-phonetic models using any known speech processing methodology.

The principles of the invention have been described with respect to specific embodiments. It will be apparent to those skilled in the art that various modifications can be made to the embodiments shown. Therefore, the spirit and scope of the invention are set out in the appended claims.

We claim:

1. A computerized method for collecting speech processing model training data using the Internet, comprising the steps of:

enabling client computers connected to the Internet to acquire speech signals and information characterizing the speech signals using Web pages;

storing addresses of the client computers in a list in a memory of a Web server computer;

selecting from the list, based upon predetermined criteria, some of the enabled client computers to acquire the speech signals and information characterizing the speech signals using the Web pages; and transmitting from at least one of the selected client computers, the acquired speech signals and information to the Web server computer, said Web server computer using the acquired and transmitted speech signals and information to generate and train speech processing models; the client computers are selected on the basis of Web domains, the Web domains are associated with specific linguistic groupings.

2. The method of claim 1 wherein the acquired speech signals and information collected at the Web server computer are used to evaluate speech processing models.

3. The method of claim 1 wherein the information includes data characterizing an acoustic environment where the speech signals are initially acquired.

4. The method of claim 1 wherein the information includes data characterizing the speaker of the speech signals.

5. Computer method for training acoustic-phonetic models using speech data collected over the Internet, comprising the steps of:

using Web pages, enabling client computers connected to the Internet to acquire speech signals and information characterizing the speech signals;

storing addresses of the client computers in a list in a memory of a Web server computer;

selecting from the list, based upon predetermined criteria, some of the enabled client computers to acquire the speech signals and information characterizing the speech signals using the Web pages;

transmitting from at least one of the selected client computers, the acquired speech signals and information to the Web server computer; and using the acquired and transmitted speech signals and information collected at the Web server computer, to generate and train acoustic-phonetic models of a speech processing system; selecting client computers on the basis of at least one of Web domain and linguistic groupings.

6. A method as claimed in claim 5 further comprising the step of using the acquired and transmitted speech signals and information to evaluate acoustic-phonetic models.

7. A method as claimed in claim 5 wherein the step of enabling includes enabling client computers to acquire information formed of at least one of data characterizing an acoustic environment where the speech signals are initially acquired and data characterizing the speaker of the speech signals.

8. Computer apparatus for collecting speech data over the Internet and training speech processing models with said collected speech data, comprising:

a plurality of client computers connected to the Internet, each client computer having a respective Web Page enabled to acquire speech signals and information characterizing the speech signals; and a Web server computer coupled across the Internet for communicating with the client computers, said Web server computer making requests of certain client computers for speech signals and information characterizing the speech signals, in response to each request from the Web server computer, said respective certain client computers transmitting acquired speech signals and information to the Web server computer for use in training speech processing models;

the Web server computer selects the certain client computers on the basis of Web domains, the Web domains are associated with specific linguistic groupings.

9. Computer apparatus as claimed in claim 8 further comprising list means coupled to the Web server computer, said list means storing addresses of the client computers in a memory of the Web server computer, such that said Web server computer makes requests of certain client computers for speech signals and information characterizing the speech signals using said list means.

10. Computer apparatus as claimed in claim 8 wherein the acquired speech signals and information are used to evaluate speech processing models.

11. Computer apparatus as claimed in claim 8 wherein the information includes data characterizing an acoustic environment where the speech signals are acquired.

12. Computer apparatus as claimed in claim 8 wherein the information includes data characterizing the speaker of the speech signals.

* * * * *